United States Patent [19]
Davis

[11] Patent Number: 5,901,911
[45] Date of Patent: May 11, 1999

[54] APPARATUS AND METHOD FOR REMOVING CAKED LITTER FROM A POULTRY FACILITY

[76] Inventor: Thomas W. Davis, Rte. 1 Box 908, Ola, Ark. 72853

[21] Appl. No.: 08/774,973

[22] Filed: Dec. 26, 1996

[51] Int. Cl.⁶ .................................................. B02C 21/02
[52] U.S. Cl. ................ 241/30; 241/101.72; 241/101.77
[58] Field of Search ..................................... 209/235, 420; 241/101.763, 101.762, 101.77, 79, 30, 101.72

[56] References Cited

U.S. PATENT DOCUMENTS

| | | | |
|---|---|---|---|
| 2,491,739 | 12/1949 | LaDow | 241/101.77 |
| 3,263,257 | 8/1966 | Stapleton . | |
| 3,412,943 | 11/1968 | Lewis et al. . | |
| 3,483,960 | 12/1969 | Wightman et al. . | |
| 3,738,579 | 6/1973 | Bretz . | |
| 4,619,412 | 10/1986 | Willingham | 241/101.762 |
| 4,711,401 | 12/1987 | Serafin . | |
| 4,854,507 | 8/1989 | Smith | 241/101.763 |
| 4,897,183 | 1/1990 | Lewis et al. . | |
| 5,078,328 | 1/1992 | Willingham | 241/101.762 |
| 5,143,309 | 9/1992 | Endom | 241/101.763 |
| 5,297,745 | 3/1994 | Vinyard . | |
| 5,495,987 | 3/1996 | Slaby | 241/101.77 |

*Primary Examiner*—Mark Rosenbaum
*Attorney, Agent, or Firm*—Head, Johnson & Kachigian

[57] ABSTRACT

A system for cleaning litter in a poultry house by removing caked litter while leaving uncaked litter. The system comprises a separator that connects and disconnects to the front bucket of a skid-steer loader while the operator remains seated. The separator and bucket couple via a bucket and separator coupling. One coupling comprises two spaced apart parallel arms that insert into corresponding sleeves that form the other coupling. Connecting requires aligned forward loader movement with the separator on the ground while disconnecting requires reverse loader movement. The separator comprises a chassis supporting a blade that forces litter into the separator. A plurality of spikes on a rotating reel forcefully break the entering litter into smaller pieces as an integral ramp feeds the litter onto an upwardly moving conveyor. Several perforations in the plates comprising the conveyor permit uncaked litter to fall through onto a return chute while caked litter is retained by a plate lip until being deposited in the bucket. The separator is powered by a hydraulic motor assembly employing a quick-coupling split shaft with automatically mating halves. When removing caked litter, the operator drives the loader through the house while pushing the separator to sift the litter. When the bucket gets full, the operator disconnects the separator and dumps the bucket. The separator is then reconnected to the loader bucket to continue cleaning.

16 Claims, 4 Drawing Sheets

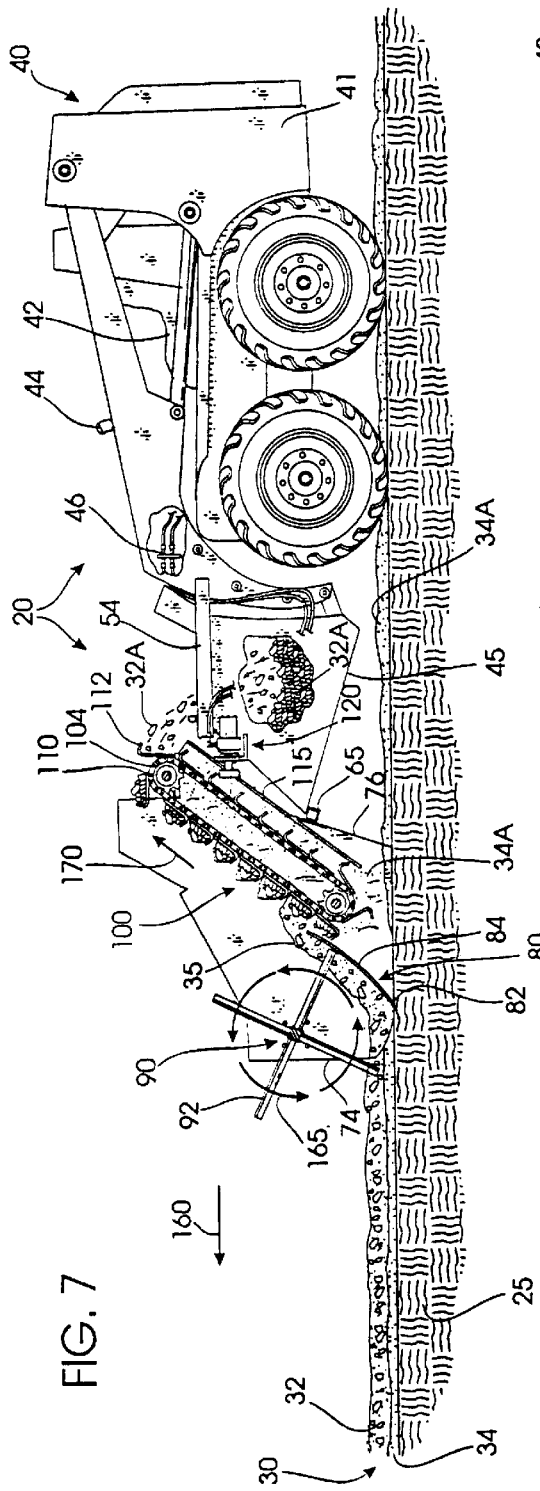
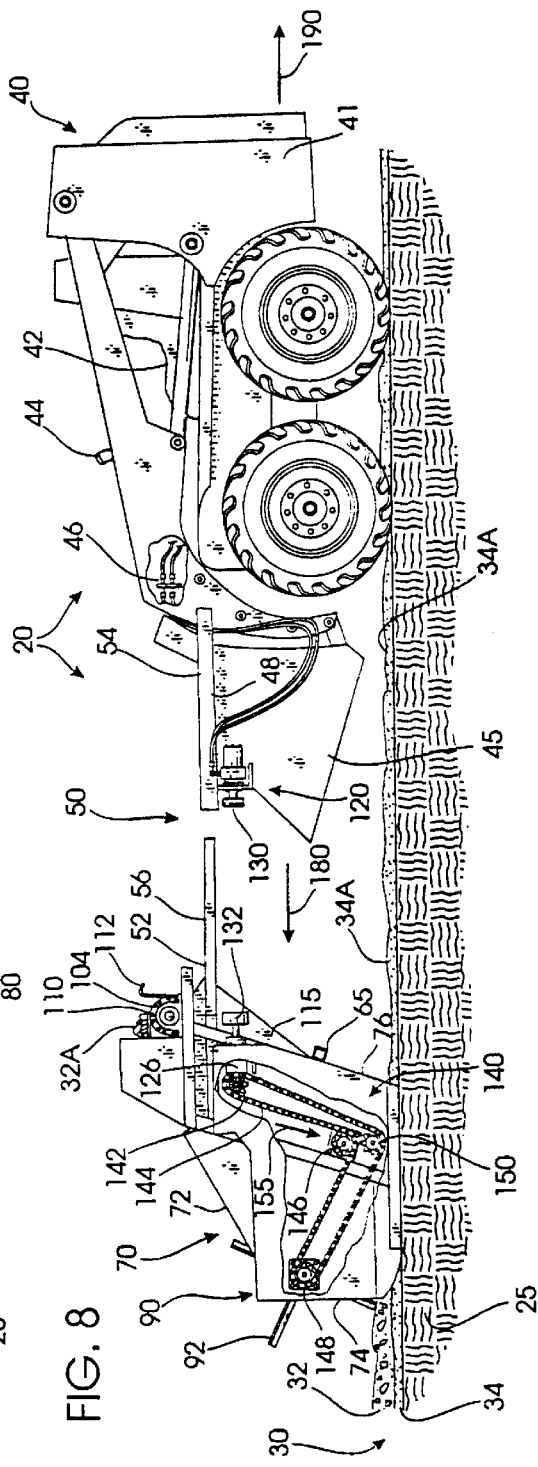

APPARATUS AND METHOD FOR REMOVING CAKED LITTER FROM A POULTRY FACILITY

BACKGROUND OF THE INVENTION

I. Field of the Invention

The present invention relates generally to powered devices that separate used litter from unused litter when cleaning poultry facilities More specifically, this invention pertains to an apparatus that quick couples to a conventional bucket to remove caked litter from a poultry house and a method of using the apparatus. Prior art may be found in U.S. Class 209 and the various subclasses thereunder.

II. Description of the Prior Art

As will be recognized by those skilled in the art, litter is often placed on the floor of a poultry facility or the like to maintain reasonably sanitary conditions therein. The litter, often comprised of sawdust, wood shavings, chips, hulls etc., absorbs excretions and/or excess water to prevent the flock from being constantly exposed to disease causing contaminants. This litter layer is usually about two inches thick.

As time passes, the absorbed materials eventually saturate the uppermost layer of litter (generally the first half inch of litter). The saturated litter forms an impenetrable crust that is commonly referred to as a "caked" layer. The "caked" layer prevents subsequent excretions from being properly absorbed by the relatively clean litter underneath the caked layer. The caked layer also causes an undesirable buildup of ammonia gas. Thus, the facility must be periodically cleaned to remove the used litter to maintain sanitary conditions.

A simplistic solution would be to remove all of the litter, including the caked top layer and the unused litter underneath. However, this solution would waste litter that was not yet saturated by contaminants. Since wasted litter is expensive to replace, a more practical approach is to scrape off and remove the top caked layer while leaving the unused litter underneath Several prior art methods and machines have been proposed to retain clean litter while removing filthy caked litter.

A traditional method of removing contaminated caked litter from poultry facilities or houses employs small tractors equipped with front end buckets and/or small front end loaders (commonly referred to as "skid-steer" loaders) Further, since most chicken houses have ceilings varying from 6 feet to 12 feet, larger tractors and/or front end loaders simply will not work inside the houses.

To clean the house, the operator drives the tractor or front end loader about the house while only scraping off the top caked layer with their front bucket. Since both of these machines are quite maneuverable, they may be adeptly driven in the tight confines of most facilities to quickly clean it.

Unfortunately, this "free hand" method of scraping demands a skilled and patient operator to enjoy any degree of success. Furthermore, even seasoned operators have trouble differentiating the caked top layer from the clean litter underneath since the front blade of the bucket is hidden during scraping. As a result, the "free hand" method usually collects too much clean litter with the caked litter.

Machines known as "caking" machines have been developed to overcome the difficulties associated with "free hand" scraping. Caking machines increase both the speed and efficiency of scraping by also separating the litter. For example, U.S. Pat. Nos. 4,897,183, 3,738,579, 3,483,960, 3,263,257, 3,412,943, and 5,297,745 all show similar caking machines.

All of the known caking machines are intended to be pulled behind a draft vehicle (ie., a tractor or the like) to clean a house. As the caking machines are pulled over the litter, a front blade scrapes across the litter to remove the top and adjacent layers. Generally, a hydraulic motor powers an intermediate screened conveyor that separates the caked litter from the unused litter as the litter moves longitudinally. The caked litter is then dumped into an integral collecting bed while the unused litter is returned to the floor.

One vexatious problem experienced with known caking machines involves their lack of maneuverability. In other words, the articulated combination of the tractor and the caking machine is exceptionally difficult to drive inside a typical poultry house. This is especially problematic in house corners where the caking machines always leave an uncleaned area because of their articulated structure.

Another problem arises with dumping the collected caked litter. Since the caked litter is ordinarily quite rich in nitrates and other plant nutrients, it is normally spread over a nearby field as fertilizer to dispose of it advantageously While a few of the known caking machines may also be used as spreaders, most caking machines must be unloaded and the litter transferred to a different machine for spreading (i.e., a fertilizer truck or buggy or the like).

The accumulated caked litter is normally dumped outside the house in a convenient pile during cleaning. In order to dump, the operator must discontinue scraping and drive outside the house. Such a disruption can easily cause the operator to forget the cleaning cessation location. Moreover, the articulated tractor and spreader combination is difficult to back up and turn around Consequently, most operators simply drive forward over the uncleaned litter. This forward movement contributes to operator confusion since the caking machine often wipes out the delineation between clean and uncleaned litter. Of course, this problem could be overcome if the operator only dumped when trips through the house were finished. However, dumping unnecessarily is inefficient and time consuming.

When finished cleaning the house, the pile of caked litter is loaded into a spreader. Often, the tractor pulling the caking machine is also used to load the dumped litter into the spreader. If so, time is wasted when uncoupling and recoupling the caking machine. A proposed solution for this dilemma involves using caking machines that double as spreaders. However, these types of caking machines are even more hindered when collecting caked litter. For example, spreaders typically have large "flotation" type wheels to traverse fields while carrying heavy loads of litter. The flotation wheels help prevent the spreaders from getting stuck in wet and/or muddy areas. Further, it is desirable for spreaders to have large capacities so that trips from the house to the field are minimized. However, both of these characteristics only accentuate maneuverability problems to inside the confines of a conventional poultry house.

Thus, an efficient caking machine that maneuvered more easily inside a conventional poultry house would be a significant improvement. A caking machine that facilitated operations in corners and adjacent support columns would be an especially desirous improvement. An ideal caking machine would combine the maneuvering characteristics of conventional bucket equipped tractors and/or front end loaders with the separating abilities of conventional caking machines.

A caking machine that simplifies and quickens the transfer of collected litter to a spreader would also be desirable. Such a machine would ideally quick couple to the draft vehicle. A machine that permitted the operator to couple and uncouple the draft vehicle without leaving his seat would be particularly desirable. Also, if the caking machine was left in place during litter dumping, it would desirably eliminate confusion regarding the location of cleaning cessation.

SUMMARY OF THE INVENTION

My caking apparatus for cleaning litter in poultry facilities overcomes the above referenced problems associated with the known prior art. The apparatus combines the superior mobility of a skid-steer loader or small tractor with an efficient separator that cooperatively facilitate quick removal of caked litter from a poultry house with minimal clean litter loss.

The separator ideally quick couples to the front bucket of a conventional skid-steer loader or the like using an easily manipulatable hitch. For example, the separator could also be used with a conventional tractor equipped with a hydraulic bucket mounted on the tractor front. Hereinafter only a skid-steer loader will be used in examples although it is to be expressly understood that the invention will work equally well with any similar vehicle.

The separator comprises a main chassis that supports several cooperating components. As the separator moves along the floor, the chassis collects and sifts the litter thereon. The chassis uses a front blade to force litter on the floor into the separator.

Preferably, a rotating reel breaks up the entering litter near the blade to facilitate subsequent sifting. Several spikes protruding from the reel forcefully strike the entering litter to break it into smaller pieces as the blade forces the litter upwardly into the chassis interior.

An integral blade ramp feeds the litter onto an upwardly moving chain driven conveyor. The conveyor transports the litter to the chassis rear while separating the caked litter from the uncaked litter. Preferably, the conveyor comprises several abutting perforated plates that sift the litter as it is transported rearwardly. Smaller uncaked litter falls through the conveyor perforations onto a chute that returns them to the floor immediately behind the blade. Larger caked litter is retained by a lip on each plate until they reach the chassis rear. The caked litter is then deposited into the bucket adjacent the chassis rear.

The reel and the conveyor are preferably driven by a hydraulic motor powered by the loader although they could be ground driven with an appropriate drive wheel and gearing. The preferred hydraulic motor assembly employs a split shaft so that it may be quick coupled as well. The split shaft comprises two mating halves. The first half is driven by the hydraulic motor and it has a terminal male end. The second half turns a gearbox and it has a terminal female end. Of course, the shaft ends could be alternated with little effect upon performance. When the separator connects to the bucket, the shaft halves automatically align and mate. Correspondingly, when the separator disconnects from the bucket, the shaft halves easily split apart.

The preferred quick coupling hitch comprises a first coupling on the bucket and a second coupling on the separator. One coupling comprises two spaced apart, parallel arms while the other coupling comprises two spaced apart, parallel sleeves. When connecting, the arms enter the sleeves to connect the bucket and separator. Of course, the sleeves may be on the bucket and the arms nay be on the separator and vice-versa.

During coupling and uncoupling, the separator rests directly upon the ground where it is frictionally held in place. Preferably, the operator simply aligns the bucket coupling with the separator coupling and then simply drives forward to connect the separator and bucket. The operator may disconnect the bucket from the separator by simply driving backwardly. Thus, when connecting or disconnecting the separator and bucket, the operator may remain in their seat to increase both speed and efficiency.

To remove caked litter from a house to clean it, an operator simply drives the loader through the house while pushing the separator to sift the litter. As the separator moves forwardly, it sifts the litter to separate caked litter from uncaked litter. The uncaked litter is returned to the floor while the caked litter is dumped into the bucket.

When the loader bucket is full, the operator disconnects the bucket from the separator by setting the bucket and separator on the ground and then backing up. The bucket may then be dumped in the usual manner (i.e., in a fertilizer truck, etc.). Cleaning may then be resumed by simply reconnecting the bucket to the separator and proceeding as before. Importantly, the operator does not miss or cover portions of the house twice because the separator remains where cleaning ceased. The previous steps are repeated as necessary until the entire house has been traversed and all of the litter has been cleaned.

Thus, a primary object of the present invention is to provide a system that quickly and efficiently removes caked litter from poultry houses and the like.

A related object of the present invention is to provide a system for quickly cleaning poultry houses that minimizes clean to litter loss.

Another related object of the present invention is to provide a system that alleviates operator confusion during cleaning by preventing clean-up cessation location loss.

A basic object of the present invention is to provide a caking machine for separating caked litter from uncaked litter that may be easily connected to and disconnected from a draft vehicle. It is a feature of the present invention that the operator need not leave the draft vehicle to couple and uncouple the caking machine.

Another basic object is to minimize operator down time.

A related object is to provide a method of cleaning poultry houses that is both quick and efficient.

A basic object of the present invention is to reduce cleaning costs for poultry facilities.

A related object is to decrease the time required to clean litter in a poultry facility.

Another related object is to enable an operator to efficiently remove caked litter from the entire floor of a poultry facility.

Yet another basic object of the invention is to increase the maneuverability of a caking system.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views:

FIG. 7 is a partially fragmented environmental view taken from the side of the invention with portions broken away or omitted for clarity; and, FIG. 8 is a partially fragmented environmental view similar to FIG. 7 but showing the loader in a moved position, with portions broken away or omitted for clarity.

DETAILED DESCRIPTION

Figure 1:
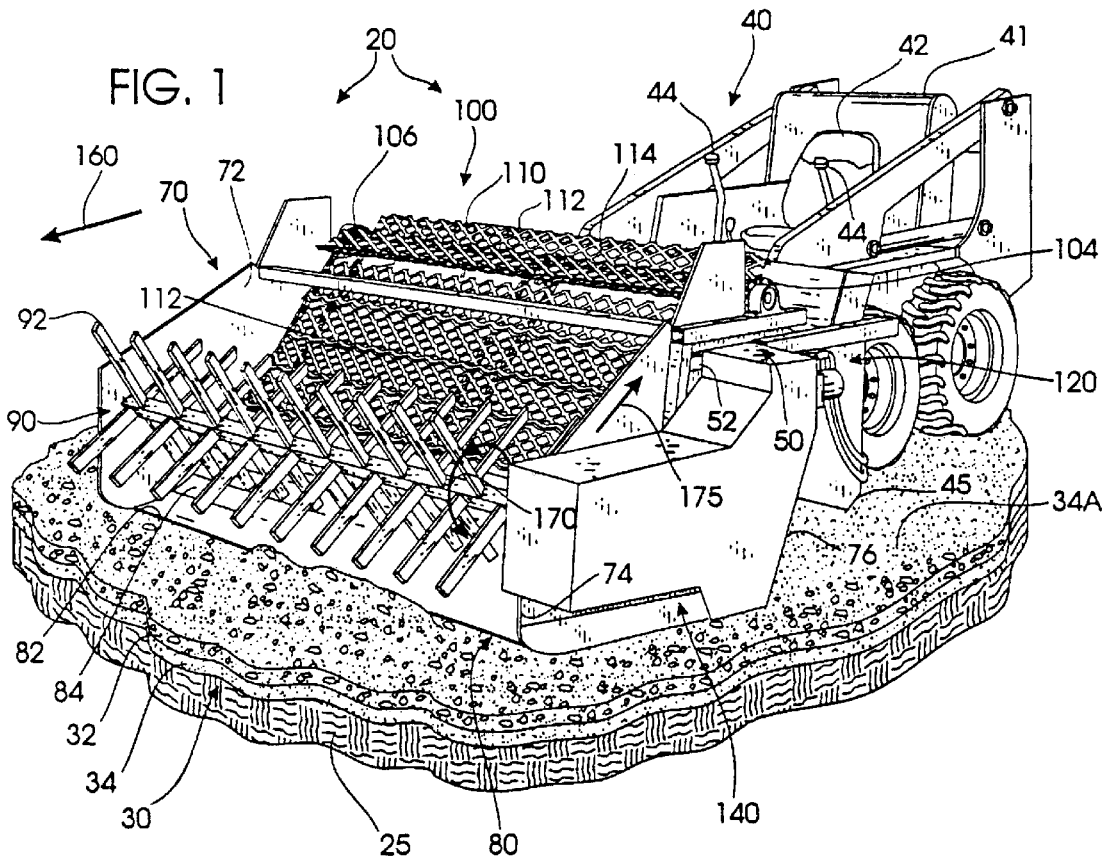
FIG. 1 is an environmental view of the preferred embodiment of my litter cleaning system taken generally from the front.
Figure 2:
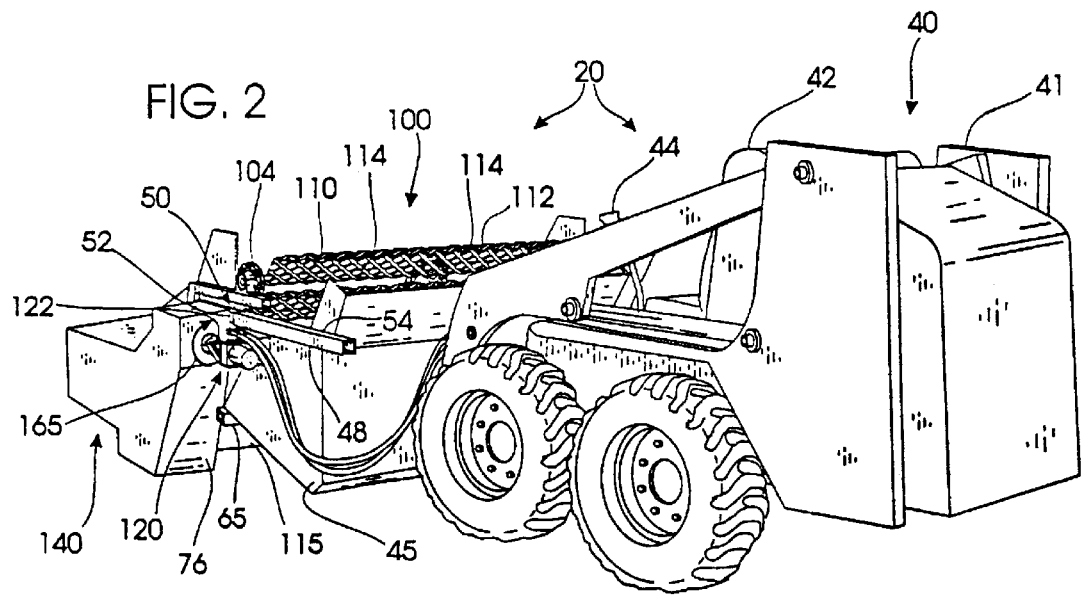
FIG. 2 is an environmental view of the invention similar to FIG. 1 but taken generally from the rear.
Figure 3:
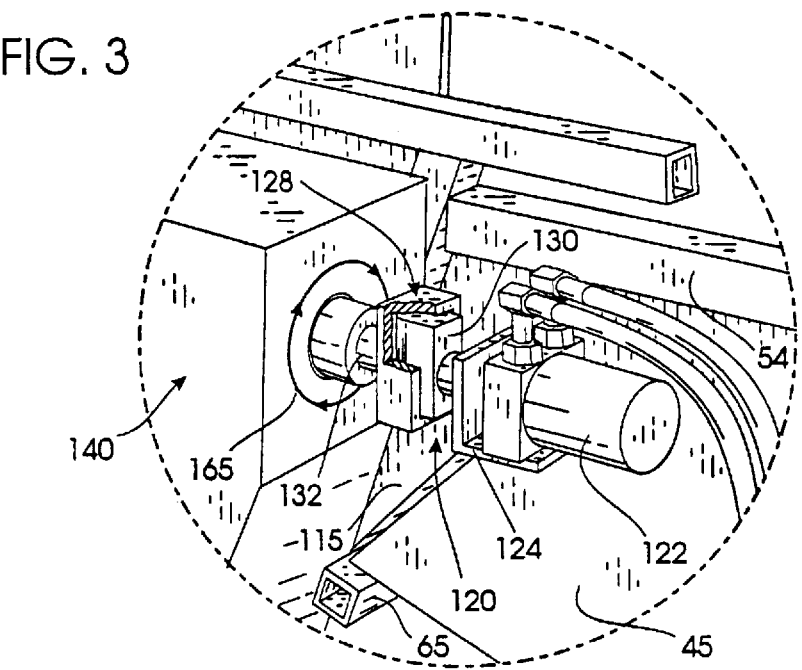
FIG. 3 is an enlarged, partially fragmented, perspective view taken from the circled portion of FIG. 2.
Figure 4:
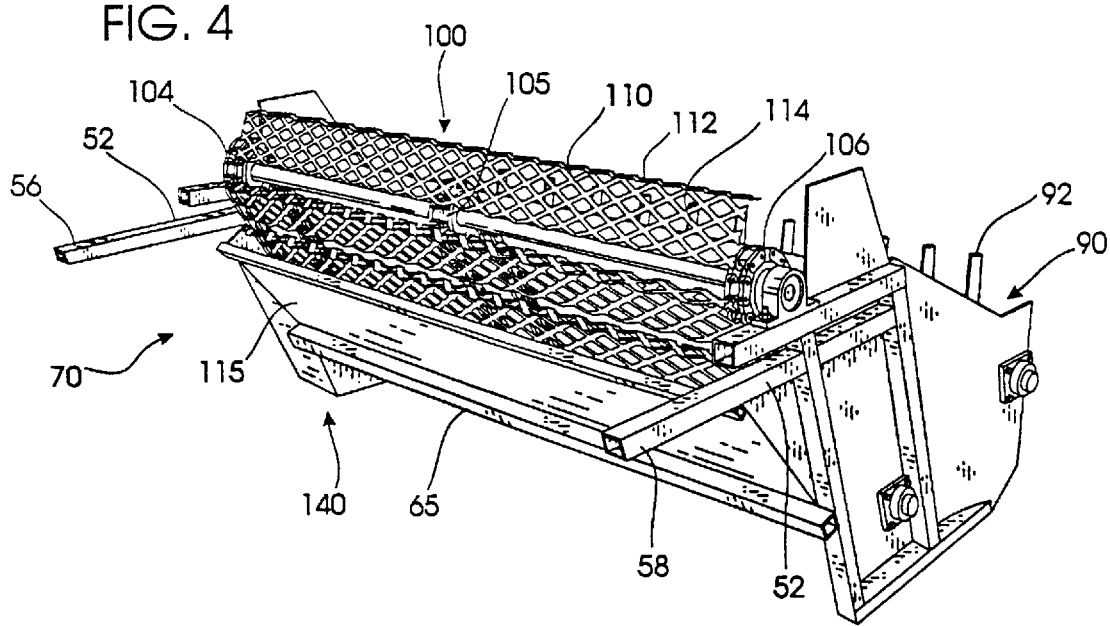
FIG. 4 is a rear perspective view of the separator with the loader and the bucket omitted for clarity.
Figure 5:
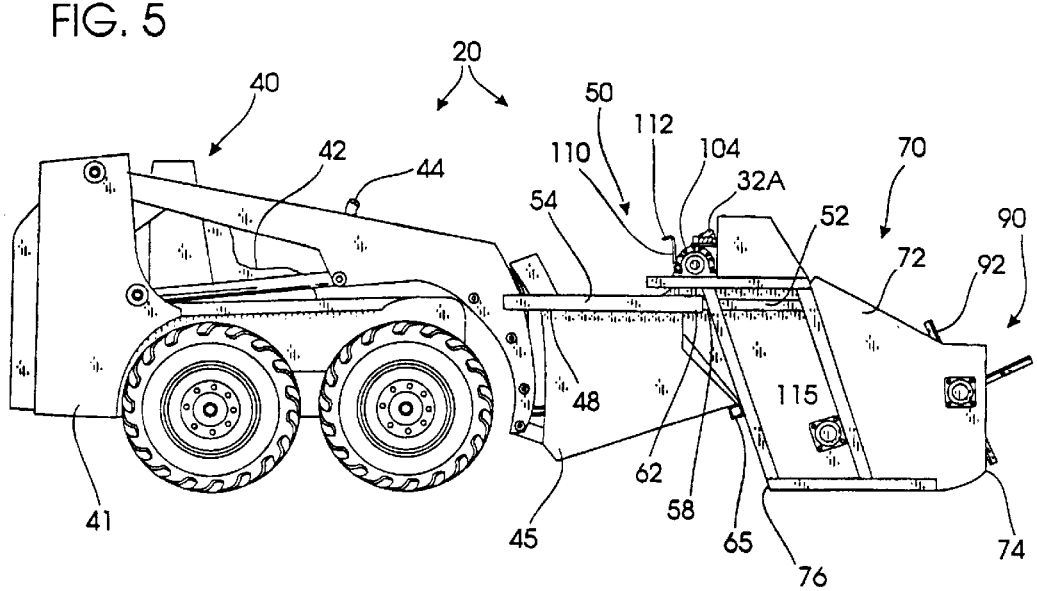
FIG. 5 is a side elevational view of the invention.
Figure 6:
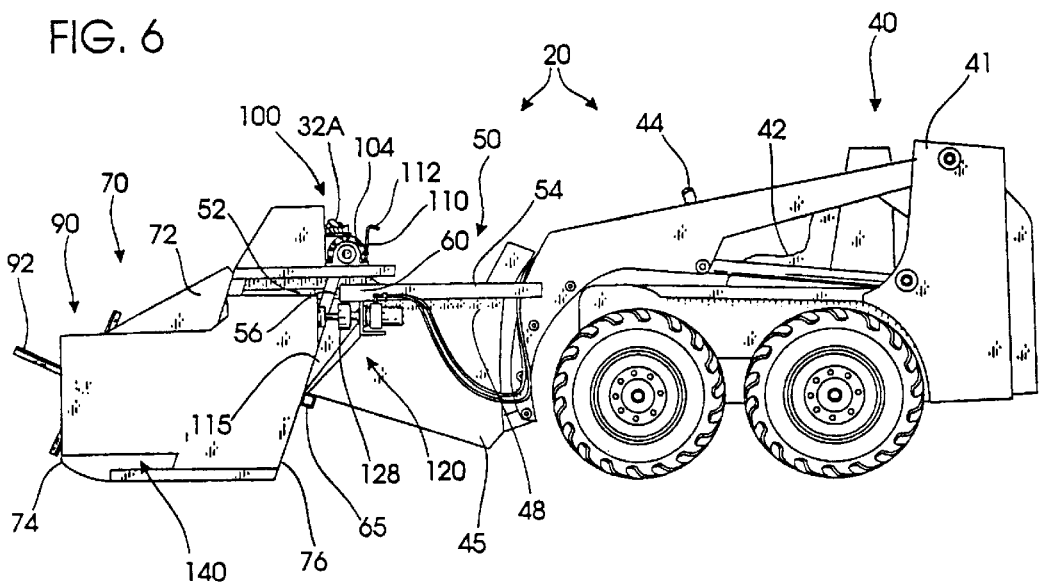
FIG. 6 is a side elevational view of the invention taken from the opposite side of FIG. 7.

Referring more specifically to the drawings, my improved cleaning system for caking litter in poultry facilities is broadly designated with reference numeral 20 in FIGS. 1–8. System 20 employs a draft vehicle 40 with a front bucket 45 and a separator 70 to clean litter 30 (FIG. 1).

Ideally, a conventional skid-steer loader 41 is used as the draft vehicle 40. Of course, separator 70 could also be used with a conventional tractor equipped with a front end hydraulic bucket or some other similarly equipped draft vehicle. The important consideration is that draft vehicle 40 must be equipped with a front bucket so that separator 70 may be easily pushed. Since the preferred embodiment is advantageously combined with a conventional skid-steer loader 41 with few modifications, hereinafter only such a loader will be expressly referenced although it will be understood by those skilled in the art that the invention will work equally well with similar draft vehicles.

Typical skid-steer loaders comprise an operator's seat 42 with easily manipulatable steering and hydraulic control levers 44 and hydraulic connections 46. Normally, the operator drives loader 41 forwardly into piles of material to gather the material into a front hydraulic bucket 45. When filled, bucket 45 is then generally dumped into a truck or the like for subsequent transportation and/or disposal In the preferred embodiment, a conventional loader 41 with bucket 45 need only be slightly modified by adding portions of quick hitch 50.

Quick hitch 50 couples the separator 70 and the hydraulic bucket 45. Hitch 50 expedites bucket to separator connecting and disconnecting while the operator remains in seat 42 as will be discussed more thoroughly later.

The preferred quick hitch 50 comprises a first coupling 52 on the separator 70 and a second coupling 54 on the bucket 45. Preferably, coupling 54 is secured to the bucket top 48. One coupling comprises two spaced apart, parallel elongated arms 56, 58 while the other coupling comprises two spaced apart, parallel open-ended elongated sleeves 60, 62. As illustrated, arms 56, 58 are on the separator 70 while sleeves 60, 62 are on the bucket 45. Preferably, sleeves 60, 62 protrude forwardly from bucket 45 while arms 56, 58 extend rearwardly from the separator 70. Of course, sleeves 60, 62 could be on the separator 70 and arms 56, 58 could be on the bucket 45 without affecting performance.

When connecting separator 70 to bucket 45, arms 56, 58 enter sleeves 60, 62. Optional beveled tips or the like could also be added to arms 56, 58 to aid in alignment of arms 56, 58 with sleeves 60, 62. A reinforcement strut 65 across the rear of separator 70 ensures proper that the bucket 45 is oriented properly. As long as arms 56, 58 remain inside sleeves 60, 62, the operator may control separator 70 by moving bucket 45 normally In other words, separator 70 may be raised, lowered, tilted, etc., by simply raising, lowering, tilting, etc., bucket 45 correspondingly.

Separator 70 comprises a chassis 72 that supports arms 56, 58 as well as several other components. As the separator 70 moves along the floor 25, the chassis collects and sifts the litter 30.

A leading blade 80 extends across the front edge 74 of chassis 72 Blade 80 forces litter 30 into the chassis interior as the separator 70 is pushed forwardly. Blade 80 preferably comprises a foremost cutting edge 82 that cuts through the caked litter 32 and the uncaked litter 34 underneath until reaching the floor 25. The cutting edge 82 force feeds the litter 30 into an integral arcuate ramp 84. Ramp 84 lifts litter 30 as it moves rearwardly in the chassis interior.

Preferably, a rotating reel 90 breaks up the entering litter 30 near the blade 80 to facilitate subsequent sifting. Several spikes 92 protruding from the reel 90 forcefully strike the entering caked and uncaked litter 32, 34 to comminute it into a mixture 35 of smaller caked pieces 32A and loose uncaked litter 34A as the blade 80 forces more litter 30 into the chassis.

The entering litter is fed onto a conveyor assembly 100. Conveyor assembly 100 comprises an endless conveyor belt driven by spaced apart chains 104, 105 and 106 secured by appropriate pillow blocks. The assembly 100 transports the litter 30 to the chassis rear 76 while separating the caked litter 32 from the uncaked litter 34. Preferably, the belt 102 comprises several abutting perforated plates 110 with an upturned lip keeper 112 along at least the rear plate edge. Thus, lip 112 retains caked litter 32A as the conveyor belt 102 moves upwardly and rearwardly.

The plates 110 sift the litter 30 as it is transported rearwardly. Smaller uncaked litter 34A falls through the conveyor perforations 114 onto a chute 115 that returns them to the floor 25 immediately behind the blade 80. Larger caked litter 32A is retained by lip 114 until reaching the chassis rear 76. The caked litter 32A is then deposited into the bucket 45 adjacent the chassis rear 76.

The reel 90 and the conveyor assembly 100 are preferably driven by a hydraulic motor assembly 120 powered by the loader 41. Ideally, the motor 120 is controlled via the hydraulic controls on one of the levers 44. Of course, both the reel 90 and the conveyor 100 could be ground driven with appropriate drive wheels and gearing.

The preferred hydraulic motor assembly 120 comprises a hydraulic motor 122 secured to the bucket 45 by a mounting bracket 124. A two-piece split shaft 128 couples the motor 122 to a ninety-degree beveled gear 126 protruding from gear box 140. The two-piece split shaft 128 facilitates quick coupling of the motor 122 to beveled gear 126.

Split shaft 128 comprises two mating halves 130 and 132. The first half 130 is rotated by the motor 122 and it has a terminal male end. The second half 132 turns beveled gear 126 and it has a terminal female end. Of course, the shaft ends could be alternated with little effect upon performance. When separator 70 connects to bucket 45, the shaft halves 130 and 132 automatically align and mate. Correspondingly, when separator 70 disconnects from bucket 45, the shaft halves 130 and 132 easily split apart as well.

Beveled gear 126 drives a series of shafts in gearbox 140 that power the conveyor 100 and the reel 90 (FIG. 8). Beveled gear 126 directly drives sprocket 142. An internal chain 144 is entrained about sprocket 142, the conveyor drive shaft 146, the reel drive shaft 148 and an idler sprocket 150. When running, chain 144 moves in the direction indicated by arrow 155. Chain 144 turns drive shaft 146 clockwise while turning drive shaft 148 counter-clockwise.

OPERATION

In use, the operator first aligns bucket 45 with separator 70. Specifically, arms 56, 58 are aligned with sleeves 60, 62 and inserted therein. Then, the operator simply drives the combined system 20 over a poultry facility floor 25 to clean the litter 30 (indicated by arrow 160 in FIGS. 1 and 7).

The separator 70 cleans the litter 30 by sifting it to remove the top layer of caked litter 32 from the clean uncaked litter 34 underneath. The separator is powered by motor 122 and it turns clockwise as indicated by arrow 165. When powered and as pushed forward by loader 41, reel 80 rotates as indicated by arrow 170 to pulverize entering litter. The conveyor belt 102 runs from the ramp 84 to the chassis rear as indicated by arrow 175. The separator 70 then deposits the caked litter 32 into bucket 45 while returning the uncaked litter 34A to floor 25.

When bucket 45 gets full of caked litter 32A, loader 41 may be quickly disconnected from separator 70. The operator first places separator 70 on floor 25 and then backs away as indicated by arrow 190. Bucket 45 is then dumped accordingly (preferably into a fertilizer truck or the like, not shown). Cleaning may be resumed by simply reconnecting separator 70 and bucket 45 and proceeding as before. Importantly, the operator does not miss or cover portions of the house twice because the separator 70 remains in the exact location where cleaning ceased. Of course, the previous steps are repeated as necessary until the entire house has been traversed and all of the litter has been cleaned. Thus, the operator may quickly remove caked litter 32A from the facility with minimal loss of clean litter 34A. Furthermore, when connecting or disconnecting the separator 70 and bucket 45, the operator may remain in seat 42 to increase both speed and efficiency.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A caking system for use with a vehicle equipped with a front-mounted bucket, said system cleaning litter by removing caked litter while leaving uncaked litter, said system comprising:

a separator selectively coupled to the front-mounted bucket for pushing through a region to be cleaned, said separator comprising a blade at its front for contacting and gathering caked and uncaked litter, conveyance means for separating caked litter from uncaked litter, means for returning uncaked litter to said region, and means for depositing unwanted caked litter into said bucket for subsequent disposal;

hitch means for releasably connecting or disconnecting said separator to said bucket while an operator remains seated, said hitch means comprising a first coupling projecting from said bucket and a second coupling projecting from said separator that is mated to said first coupling when said vehicle moves toward said separator and disconnected when said vehicle backs away from said separator; and, means for powering said separator to operate said conveyance means.

2. The system as defined in claim 1 wherein said hitch means comprises a pair of parallel spaced apart sleeves and a pair of cooperating, spaced apart arms adapted to coaxially, telescopingly mate in said sleeves.

3. The system as defined in claim 1 wherein said means for powering comprises a quick coupling hydraulic motor assembly.

4. The system as defined in claim 3 wherein said quick coupling hydraulic motor assembly comprises:

a hydraulic pump adapted to be selectively rotated;

a gearbox driven by said pump when said pump rotates; and, a split shaft having two separable halves, said split shaft adapted to transfer rotary power from said pump to said gearbox when said halves are mated, said first half protruding from said pump and having a terminal male end and said second half protruding from said gear box and having a terminal female end adapted to receive said male end to mate said halves.

5. The system as defined in claim 1 wherein said separator further comprises a rotatable reel secured adjacent said blade and rotated by said means for powering, said reel breaking caked litter entering said separator into smaller pieces while jostling uncaked litter therefrom.

6. The system as defined in claim 5 wherein:

said blade comprises a sloping ramp adjacent said reel for moving litter upwardly to the rear of said reel as said separator is pushed forwardly;

said conveyance means comprises a porous conveyor assembly adjacent said ramp for transporting and sifting said upwardly moving litter;

said means for returning uncaked litter comprises a chute beneath said conveyor for routing uncaked litter dropping from said conveyor back onto said region; and, said means for depositing unwanted caked litter comprises a plurality of spaced apart keepers on said conveyor that each ejects said caked litter into said bucket.

7. The system as defined in claim 6 wherein said conveyor assembly comprises a plurality of separate, perforated planar plates and chain drive means for actuating said plates, each plate comprising an upturned lip formed along at least one edge, said upturned lip retaining said caked litter until said caked litter is deposited into said bucket.

8. A method of removing caked litter from the floor of a facility comprising the steps of:

a) coupling a draft vehicle equipped with a front-mounted bucket to a separator;

b) pushing said separator through said litter to separate caked litter from uncaked litter, said separator depositing said caked litter in said bucket while returning said uncaked litter to the floor;

c) uncoupling the draft vehicle from said separator when said bucket is full;

d) emptying said bucket remotely; and, e) repeating steps (a) through (d) until said separator traverses the entire facility.

9. The method as defined in claim 8 wherein the operator remains seated during the coupling and uncoupling of the draft vehicle to and from said separator.

10. The method as defined in claim 9 wherein said coupling step (a) is performed by aligning and driving the draft vehicle forwardly when the separator is on the floor until a pair of parallel spaced apart sleeves mate with a pair of cooperating, spaced apart arms.

11. The method as defined in claim 9 wherein said uncoupling step (c) is performed by driving the draft vehicle rearwardly when said separator is on the floor until a pair of parallel spaced apart sleeves release a pair of cooperating, spaced apart arms.

12. The method as defined in claim 8 wherein said separator comprises:

a rotating reel that breaks said caked litter into smaller pieces;

a bladed ramp adjacent said reel that gathers and then lifts said litter upwardly and rearwardly as said separator moves forwardly;

a conveyor penetrated by a plurality of holes that permit uncaked litter to fall through while said caked litter is transported upwardly and rearwardly until being deposited in said bucket;

a chute beneath said conveyor that returns said uncaked litter to the facility floor; and, means for powering said reel and said conveyor.

13. The method as defined in claim 12 wherein said means for powering comprises a quick coupling hydraulic motor assembly.

14. The method as defined in claim 13 wherein said quick coupling hydraulic motor assembly comprises:

a hydraulic pump adapted to be selectively rotated;

a gearbox driven by said pump when said pump rotates; and, a split shaft having two separable halves, said split shaft adapted to transfer rotary power from said pump to said gearbox when said halves are mated, said first half protruding from said pump and having a terminal male end and said second half protruding from said gear box and having a terminal female end adapted to receive said male end to mate said halves.

15. The method as defined in claim 14 wherein the operator remains seated during the coupling and uncoupling of the draft vehicle to and from said separator.

16. The method as defined in claim 15 wherein said coupling step (a) is performed by aligning and driving the draft vehicle forwardly when the separator is on the floor until a pair of parallel spaced apart sleeves mate with a pair of cooperating, spaced apart arms and wherein said uncoupling step (c) is performed by driving the draft vehicle rearwardly when said separator is on the floor until a pair of parallel spaced apart sleeves release a pair of cooperating, spaced apart arms.

* * * * *